United States Patent [19]

Jeon

[11] Patent Number: 5,771,332
[45] Date of Patent: Jun. 23, 1998

[54] 8 MM VIDEO TAPE RECORDING/ REPRODUCING APPARATUS CAPABLE OF PERFORMING A HIGH-SPEED SEARCH OPERATION

[75] Inventor: Jin-kyu Jeon, Suwon, Rep. of Korea

[73] Assignee: Samsung Electronics Co., Ltd., Kyungki-Do, Rep. of Korea

[21] Appl. No.: 563,017

[22] Filed: Nov. 27, 1995

[30] Foreign Application Priority Data

Nov. 25, 1994 [KR] Rep. of Korea ........................ 92-31285

[51] Int. Cl.$^6$ ........................................... H04N 5/91
[52] U.S. Cl. ............................ 386/69; 360/77.14; 386/81
[58] Field of Search .............................. 360/18, 69, 72.1, 360/72.2, 73.04, 73.09, 73.12, 73.13, 77.14, 49, 27, 77.15; 358/335; 386/14, 16, 69, 46, 86, 95, 56, 113; H04N 5/91

[56] References Cited

U.S. PATENT DOCUMENTS

| | | | |
|---|---|---|---|
| 4,558,381 | 12/1985 | Edakubo et al. | 360/77.15 |
| 4,568,986 | 2/1986 | Furuhata et al. | 360/10.2 |
| 4,768,106 | 8/1988 | Ito et al. | 386/56 |
| 4,791,497 | 12/1988 | Nakano et al. | 360/32 |
| 4,816,940 | 3/1989 | Nagasawa et al. | 360/77.15 |
| 4,839,755 | 6/1989 | Yamada et al. | 360/73.13 |
| 4,916,554 | 4/1990 | Takahashi et al. | 360/77.15 |
| 4,951,162 | 8/1990 | Yoshimura et al. | 360/77.14 |
| 4,954,902 | 9/1990 | Furuhata et al. | 360/10.2 |
| 4,958,246 | 9/1990 | Kozuki et al. | 360/77.15 |
| 4,984,104 | 1/1991 | Takahashi et al. | 360/77.14 |
| 5,008,764 | 4/1991 | Yoshida et al | 360/77.15 |
| 5,047,879 | 9/1991 | Fukatsu et al. | 360/72.1 |
| 5,109,305 | 4/1992 | Ohsawa et al. | 360/77.15 |
| 5,126,892 | 6/1992 | Nagasawa et al. | 360/77.15 |
| 5,258,879 | 11/1993 | Shimotashiro et al. | 360/77.15 |
| 5,402,281 | 3/1995 | Yanagihara et al. | 360/77.15 |
| 5,432,655 | 7/1995 | Nakamura et al. | 386/113 |
| 5,585,932 | 12/1996 | Kim | 386/69 |

Primary Examiner—Tommy P. Chin
Assistant Examiner—Y. Lee
Attorney, Agent, or Firm—Sughrue, Mion, Zinn, Macpeak & Seas, PLLC

[57] ABSTRACT

An 8 mm image recording/reproducing apparatus is provided which is capable of searching for information recorded on a video tape based on signals recorded on a track of the video tape. Furthermore, the apparatus is capable of performing tracking control in accordance with reference pilot signals. The apparatus contains a controller, a pilot signal generator, a search reference signal generator, a recording/reproducing section, and an index signal separator. The controller generates a mode selection signal and a pilot selection signal, and the mode selection signal indicates whether the apparatus is operating in an index signal record mode or an index signal separation mode. The pilot signal generator sequentially and cyclically generates the reference pilot signals. The search reference signal generator generates an index signal and an index separation reference signal based on at least is one of the mode selection signal and the pilot selection signal. The recorder/reproducer records the reference pilot signals output from the pilot signal generator and the index signal on the video tape and reproduces a previously recorded index signal and at least a second signal from the video tape. Finally, the index signal separator separates the previously recorded index signal from the at least a second signal. Accordingly, the present invention is capable of performing high-speed search operations without adversely affecting the compatibility of a conventional 8 mm format.

23 Claims, 1 Drawing Sheet

8 MM VIDEO TAPE RECORDING/ REPRODUCING APPARATUS CAPABLE OF PERFORMING A HIGH-SPEED SEARCH OPERATION

FIELD OF THE INVENTION

The present invention relates to a recording/reproducing apparatus capable of performing a high-speed search operation. More particularly, the invention relates to an apparatus which is able to locate information recorded on an 8 mm tape during a high-speed search operation.

BACKGROUND OF THE INVENTION

A video cassette recorder (VCR) having a video home system (VHS) format is capable of performing high-speed search operations to locate information previously recorded on a video tape. The video tape contains video tracks, and video information is recorded on such tracks via a helical-scan recording process. Furthermore, the tape includes a control track which contains reference signals that correspond to the movement and position of the tape. In addition, the control track is disposed in the longitudinal direction of the tape and is located below the video tracks.

The VCR comprises a control head and a video head for respectively reading the reference signals recorded in the control track and the video information recorded in the video tracks. As a result, the VCR can perform a high-speed search operation by reading the various reference signals stored in the control track.

On the other hand, an 8 mm video tape does not have a separate control track for storing reference signals, and an 8 mm VCR or camcorder does not have a separate control head for reading reference signals. Therefore, the 8 mm VCR and camcorder control the movement of the 8 mm tape via an Automatic Track Finding (ATF) method. Specifically, in accordance with the ATF method, various pilot signals having different frequencies are superposed upon a video signal. Furthermore, the superposed video signal is recorded on the video tape such that each video track of the tape contains a pilot signal having a frequency which is different from the pilot signals recorded on adjacent video tracks. Subsequently, when the video information is reproduced from the video tape, the pilot signals are separated from the video information and compared with a reference pilot signal. As a result, the VCR or camcorder can determine the orientation of a video head and the 8 mm tape based on the relative frequencies of the pilot signals. Thus, the VCR or camcorder can adjust the tracking of the video head based on such comparison so that the video head is properly positioned with respect to the desired video track. However, even though an 8 mm VCR and camcorder can perform tracking control via the ATF method, such devices cannot perform high-speed search operations to find particular information recorded on the 8 mm video tape.

SUMMARY OF THE INVENTION

In order to solve the problems above, one object of the present invention is to provide a recording/reproducing apparatus which is capable of performing high-speed search operations without adversely affecting the compatibility of a conventional 8 mm format. In order to achieve the object above, an image recording/reproducing apparatus is provided which is capable of searching for information recorded on a video tape based on signals recorded on a track of the video tape and which is capable of performing tracking control in accordance with reference pilot signals. Specifically, the apparatus comprises: control means for generating a mode selection signal and a pilot selection signal, wherein the mode selection signal indicates whether the apparatus is operating in an index signal record mode or an index signal separation mode; pilot signal generating means for sequentially and cyclically generating the reference pilot signals; search reference signal generating means for generating an index signal and an index separation reference signal based on at least one of the mode selection signal and the pilot selection signal; recording/reproducing means for recording the reference pilot signals output from the pilot signal generating means and the index signal on the video tape and for reproducing a previously recorded index signal and at least a second signal from the video tape; and index signal separation means for separating the previously recorded index signal from at least a second signal.

BRIEF DESCRIPTION OF THE DRAWINGS

The present invention will be described in more detail with reference to the accompanying drawing in which.

DETAILED DESCRIPTION OF THE PREFERRED EMBODIMENTS

Figure 1:
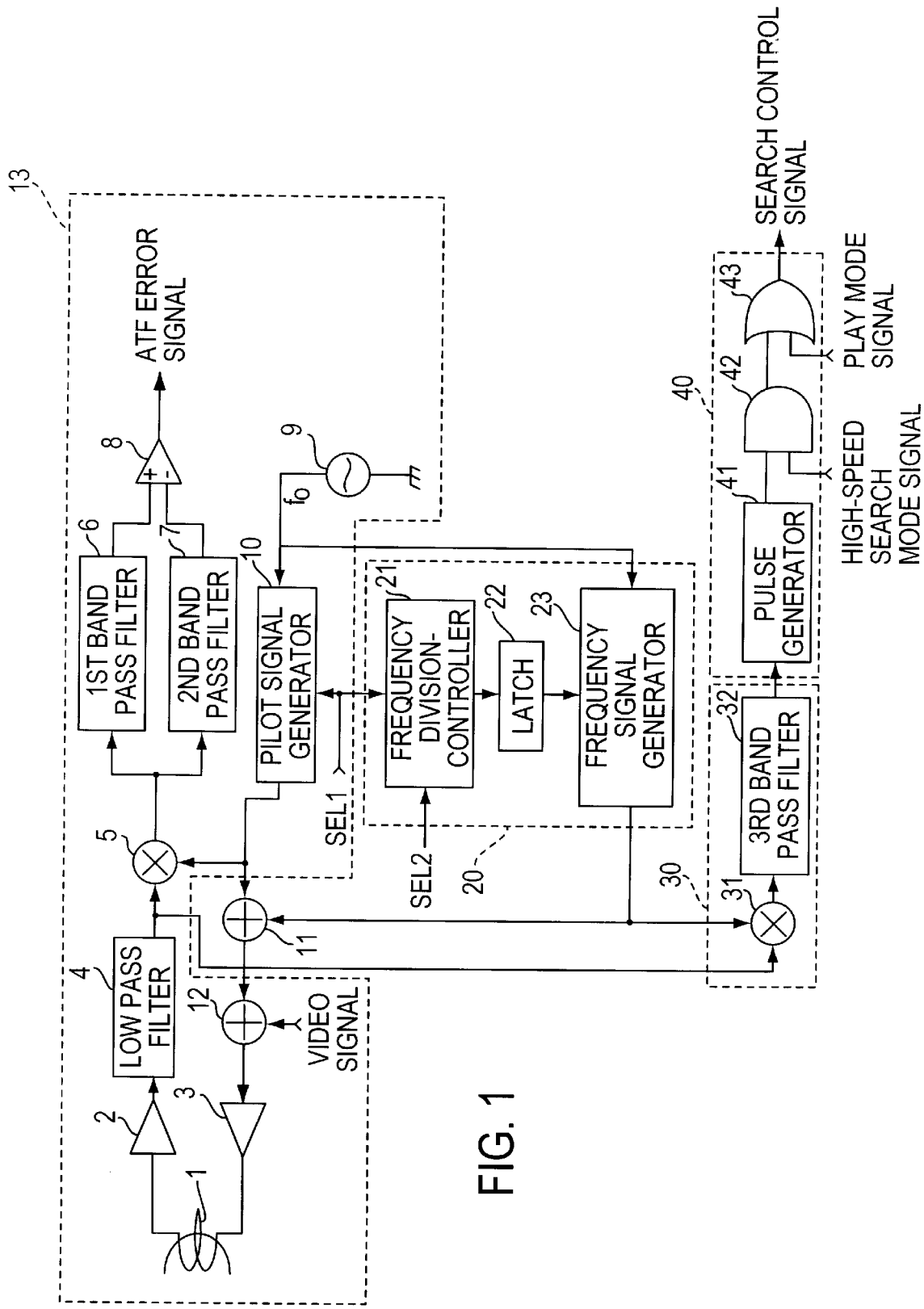
FIG. 1 is a block diagram of an illustrative embodiment of the recording/reproducing apparatus of the present invention.

FIG. 1 shows a block diagram of an illustrative embodiment of the recording/reproducing apparatus of the present invention. In particular, the apparatus comprises an Automatic Track Finding (ATF) portion 13, a search reference signal generator 20, a first mixer 11, an index signal separator 30, and a search control signal generator 40.

The ATF portion 13 comprises a video head 1, a reproducing amplifier 2, a low pass filter 4, and a demodulator 5. The video head 1, reproduces signals from a magnetic tape, and the amplifier 2 amplifies such signals. Then, the low pass filter 4 extracts reproduced pilot signals and a high-speed search signal (e.g. index signal) from the video signal, and the pilot signals and search signal are output to the demodulator 5 and the index signal separator 30.

The ATF portion 13 also includes a first band pass filter 6, a second band pass filter 7, a comparator 8, an oscillator 9, and a pilot signal generator 10, and such components 6 to 10 are used to generate an ATF error signal for controlling the tracking of the video head 1. In particular, the oscillator 9 generates a reference frequency signal $f_0$ and outputs such signal $f_0$ to the pilot signal generator 10. The generator 10 inputs the signal $f_0$ and a pilot selection signal SEL1 output from a system controller (not shown), divides the frequency of the reference frequency signal $f_0$ in accordance with the value of the signal SEL1, and sequentially outputs a series of pilot signals $f_1$ to $f_4$ having different frequencies. Furthermore, the particular pilot signal $f_1$, $f_2$, $f_3$, or $f_4$ output from the generator 10 at any given instant is designated as a reference pilot signal.

The demodulator 5 inputs the reproduced pilot signals from the filter 4 and the reference pilot signal $f_1$, $f_2$, $f_3$, or $f_4$ from the generator 10 and generates frequency difference signals which have frequencies equal to the frequency difference between the reproduced pilot signals and the reference pilot signal. Then, the frequency difference signals are output to the first and second band pass filters 6 and 7 which respectively output only the frequency difference signals having frequencies of 16 KHz and 46 KHz. Subsequently, the signals output from the filters 6 and 7 are supplied to the comparator 8, and the comparator 8 generates the ATF error signal based on the difference between such signals. As a result, the ATF error signal indicates the degree to which the video head 1 has deviated from the video track that it has been designated to read.

The ATF portion 13 also contains a second mixer 12 and a recording amplifier 3 for recording various signals on the tape. Specifically, the first mixer 11 inputs the reference pilot signal $f_1$, $f_2$, $f_3$, or $f_4$ from the pilot signal generator 10, mixes the reference pilot signal with an index signal generated by the search reference signal generator 20, and outputs the resultant mixed signal. Then, the second mixer 12 mixes the signal output from the first mixer 11 with a video signal and supplies the resultant signal to the amplifier 3. Afterwards, the resultant signal is amplified by the amplifier 3 and recorded on the video tape via the video head 1.

The search reference signal generator 20 inputs the reference frequency signal $f_0$ from the oscillator 9, the pilot selection signal SEL1 from the system controller (not shown) and a mode selection signal SEL2 from the system controller (not shown). Then, the generator 20 outputs various signals based on such signals $f_0$, SEL1, and SEL2. In particular, the generator 20 outputs an index signal to be recorded on a video tape during an index signal record mode and outputs an index separation reference signal during an index signal separation mode. The detailed configuration of the search reference signal generator 20 and its operation will be described below.

As shown in FIG. 1, the generator 20 comprises a frequency division controller 21, a latch 22, and a frequency signal generator 23. The frequency division controller 21 inputs the pilot selection signal SEL1 and the mode selection signal SEL2 and outputs frequency division values based on such signals SEL1 and SEL2. Specifically, the controller 21 outputs a first frequency division value having a first value during the index signal record mode and outputs a second frequency division value having a second value during the index signal separation mode. The frequency division values are supplied to the latch 22 and output from the latch 22 to the frequency signal generator 23. The generator 23 inputs the reference frequency signal $f_0$ from the oscillator 9 and divides the value of the signal $f_0$ based on the frequency division value output from the latch. As a result, during the index signal record mode, the generator 23 frequency divides the signal $f_0$ based on the first frequency division value to produce an index signal. Conversely, during the index signal separation mode, the generator 23 frequency divides the signal $f_0$ in accordance with the second frequency division value to generate an index separation reference signal.

The index signal separator 30 inputs the reproduced pilot signals and the high-speed search signal (e.g. index signal) from the low pass filter 4 and inputs the index separation reference signal from the search reference signal generator 20. Then, the separator 30 reproduces an index signal previously recorded on the magnetic tape based on such signals. In particular, the index signal separator 30 comprises a demodulator 31 and a third band pass filter 32. The demodulator 31 demodulates the pilot signals and high-speed search signal based on the index separation reference signal to produce a demodulated signal. Then, the third band pass filter 32 inputs the demodulated signal and extracts the index signal having a predetermined frequency from among the various demodulated frequency components of the demodulated signal.

The search control signal generator 40 inputs the index signal from the third band pass filter 32 as well as a high-speed search mode signal and a play mode signal from the system controller. Subsequently, the generator 40 outputs a search control signal in accordance with such signals. Specifically, the generator 40 comprises a pulse generator 41, an AND gate 42, and an OR gate 43. The pulse generator 41 inputs the index signal from the filter 32 and outputs a pulse signal having a constant duty cycle while the index signal is applied. The AND gate 42 inputs the pulse signal and the high-speed search mode signal, performs an AND operation on such signals, and outputs a resultant multiplied signal. Then, the OR gate 43 inputs the multiplied signal and the play mode signal, performs an OR operation on such signals, and outputs the search control signal.

An illustrative example of how the 8 mm VCR performs tracking control will be described below. Assuming that the 8 mm VCR adopts an NTSC format, the oscillator 9 outputs a reference frequency signal $f_0$ which has a frequency of 5.95 MHz. The pilot signal generator 10 inputs the signal $f_0$ and generates one of the four reference pilot signals $f_1$ to $f_4$ based on the value of the pilot selection signal SEL1. For instance, the generator 10 may output reference pilot signals $f_1$ to $f_4$ respectively having frequencies of 102.54 KHz, 118.95 KHz, 165.21 KHz, and 148.69 KHz which may be eventually superposed on the video signal and recorded on the magnetic tape. Furthermore, the generator 10 may output a different pilot signal $f_1$, $f_2$, $f_3$, or $f_4$ for each track of information recorded on the tape such that the pilot signals $f_1$ to $f_4$ are sequentially and cyclically recorded on the tape. As a result, pilot signals having the same frequency are recorded every four tracks. Also, in order to discriminate from among the four types of reference pilot signals $f_1$ to $f_4$, the pilot selection signal SEL1 comprises at least two bits (i.e. $2^2=4$).

The index signal reproduced from the tape and output from the filter 4 has a frequency value which does not equal the values of the differences between the frequencies of the reference pilot signals $f_1$ to $f_4$ and the pilot signals reproduced from the tape. For example, in the index signal separation mode, if the pilot signal $f_1$ has been recorded on a track of the magnetic tape which is currently being reproduced by the video head 1, the video signal input to the low pass filter 4 includes the pilot signal $f_1$ on the reproduced track as well as the pilot signals $f_2$ and $f_4$ on the two adjacent tracks. The low pass filter 4 separates the pilot signals $f_4$, $f_1$, and $f_2$ from the video signal and outputs such signals $f_4$, $f_1$ and $f_2$ to the demodulator 5. At this time, the system controller outputs a pilot selection signal SEL1 which instructs the pilot signal generator 10 to output the reference pilot signal $f_3$. Consequently, the demodulator 5 demodulates each of the reproduced pilot signals $f_1$, $f_2$, and $f_4$ in accordance with the reference pilot signal $f_3$ to obtain three frequency difference signals. Specifically, the frequency difference signals respectively have frequency values equaling 62 KHz, 46 KHz, and 16 KHz (i.e. $f_3-f_1=62$ KHz, $f_3-f_2=46$ KHz, and $f_3-f_4=16$ KHZ). The band pass filters 6 and 7 input the frequency difference signals and respectively pass only the frequency difference signals having frequencies which equal 16 KHz and 46 KHz.

As a result, the filtered frequency difference signals are supplied to the comparator 8, and the comparator 8 outputs the ATF error signal based on the relative magnitudes of the frequency difference signals. For example, if the video head 1 is leaning towards the track upon which the pilot signal $f_4$ is recorded, the magnitude of the frequency difference signal (16 KHz) output from the band pass filter 6 increases. On the other hand, if the head 1 is leaning towards the track upon which the pilot signal $f_2$ is recorded, the magnitude of the frequency difference signal (46 KHz) output from the filter 7 increases. Accordingly, the comparator 8 detects the difference between the magnitudes of the 16 KHz and 46 KHz frequency components and outputs the ATF error signal indicating the extent to which the head 1 has deviated from the track on which the pilot signal $f_1$ is recorded.

Furthermore, the 8 mm VCR shown in FIG. 1 may be designed to record index signals on the magnetic tape during the index signal record mode by mixing the index signal with the reference pilot signal $f_3$. Accordingly, if another reference pilot signal $f_1$, $f_2$, or $f_4$ is output from the pilot signal generator 10, an index signal might not recorded on the magnetic tape. For example, if the system controller outputs a pilot selection signal SEL1 to instruct the generator 10 to output the reference pilot signal $f_1$ during the index signal record mode, the search reference signal generator 20 simultaneously inputs the particular signal SEL1 and does not produce an index signal. Therefore, the reference pilot signal $f_1$ is output to the first mixer 11 and is not mixed with an index signal. Accordingly, only the reference pilot signal $f_1$ is output to the second mixer 12 and mixed with the video signal.

On the other hand, when the pilot signal generator 10 generates the pilot signal $f_3$, the frequency division controller 21 outputs a frequency division value based on the mode selection signal SEL2. As described above, this frequency division value has a first value if the mode selection signal SEL2 indicates that the VCR is operating in an index signal record mode and has a second value if the signal SEL2 indicates that the VCR is operating in the index signal separation mode. The frequency division value is input to the latch 22, and the latch outputs the frequency division value during a period of one track. Accordingly, the frequency signal generator 23 frequency-divides the reference frequency signal $f_0$ in accordance with the value of the frequency division value and outputs either an index signal or an index separation reference signal. In particular, during the index signal record mode, the generator 23 outputs an index signal $f_5$. On the other hand, the generator 23 outputs an index separation reference signal having a frequency which equals the frequency of the pilot signal $f_3$ during the index signal separation mode. The frequency signal generator 23 outputs the index signal at particular intervals during which the index signal is to recorded on the video tape. Similarly, the generator 23 outputs the index separation reference signal at intervals during which the index signal is to be reproduced from the pilot signal output from the filter 4.

The frequency value of the index signal $f_5$ is determined according to the frequency of the pilot signals $f_1$ and $f_3$. For example, since the frequency difference between the reproduced pilot signals $f_1$ (102.54 KHz) and $f_3$ (165.21 KHz) is approximately equal to 62 KHz ($f_3-f_1$), the index signal $f_5$ should either be less than 40 KHz ($f_1-62$ KHz) or greater than 227 KHz ($f_3+62$ KHz).

However, if the signal $f_5$ equals 227 KHz, the signal $f_5$ would directly and adversely interfere with low-passed and recorded color signals. Therefore, the index signal $f_5$ should preferably equal a frequency less than 40 KHz.

During the index signal record mode, the index signal $f_5$ is output from the frequency signal generator 23 and supplied to the first mixer 11. Then, the mixer 11 mixes the signal $f_5$ with the pilot signal $f_3$ to produce a first mixed signal, and the first mixed signal is output to the second mixer 12. Subsequently, the mixer 12 mixes the first mixed signal with the video signal to produce a second mixed signal, and the second mixed signal is output to the video head via recording amplifier 3. Consequently, the second mixed signal is recorded on the video tape.

During the index signal separation mode, an index signal is reproduced from the magnetic tape and filtered by the low pass filter 4, and the search reference signal generator 20 outputs the index separation reference signal $f_3$. Consequently, the demodulator 31 inputs the reproduced index signal output from the filter 4 and the reference signal $f_3$ and demodulates the index signal in accordance with the signal $f_3$. For example, if the frequency of the reproduced index signal equals 40 KHz, the demodulator 31 outputs two frequency components having frequencies of 125 KHz and 205 KHz, respectively ($f_3\pm40$ KHz=165.21 KHz$\pm40$ KHz).

The third band pass filter 32 outputs one of the two frequency components 125 KHz or 205 KHz to the pulse generator 41 as the reproduced index signal. For example, if the filter 32 passes only frequency components having a frequency of 205 KHz, an index signal having a frequency of 205 KHz will be output to the generator.

The pulse generator 41 inputs the index signal from the filter 32 and outputs a pulse signal which has a constant, uniform duty cycle when the index signal is being input. Furthermore, the width of the pulse signal varies in accordance with the amount of time that the video signal contained in the track from which the index signal is derived is displayed on the television screen. For instance, the width of the pulse signal may equal three seconds if the video signal is displayed on the screen for three seconds. The pulse generator 41 may be designed in a variety of manners and may comprise a monostable circuit.

The pulse signal output from the generator 41 is supplied to the AND gate 42, and the AND gate 42 logically multiplies the high-speed search mode signal and the pulse signal. The high-speed search mode signal is generated during the high speed search mode, and thus, the AND gate 42 generates a binary signal which corresponds to value of the pulse signal during such mode. Moreover, since the high-speed search mode signal is only generated during the high speed search mode, the AND gate 42 eliminates any noise output from the pulse generator 41 when the system is not performing a high speed search.

The OR gate 43 inputs the multiplied signal from the AND gate 42 and a play mode signal and outputs a search control signal based on such signals. Since the play mode signal is high during a normal reproduction operation, the search control signal is output from the OR gate during both a normal reproduction operation and a high speed search operation. The search control signal is used in the image recording/reproducing apparatus provided with the device of FIG. 1.

As described above, the present invention enables an 8 mm VCR or camcorder to perform a high-speed search operation. Moreover, since the present invention is capable of being used with a conventional ATF device, the present invention does not significantly increase the size or reduce the compatibility of the 8 mm VCR or camcorder.

Furthermore, the embodiments described above are merely illustrative, and modifications of such embodiments may occur to those skilled in the art. Accordingly, this invention is not to be regarded as limited to the embodiments disclosed herein, but is to be limited only as defined by the appended claims.

What is claimed is:

1. An image recording/reproducing apparatus, which is capable of searching for information recorded on a video tape based on signals recorded on a track of said video tape and which is capable of performing tracking control in accordance with reference pilot signals, the apparatus comprising:

control means for generating a mode selection signal and a pilot selection signal, wherein said mode selection signal indicates whether said apparatus is operating in an index signal record mode or an index signal separation mode;

pilot signal generating means for sequentially and cyclically generating said reference pilot signals;

search reference signal generating means for generating an index signal and an index separation reference signal based on at least one of said mode selection signal and said pilot selection signal;

recording/reproducing means for recording said reference pilot signals output from said pilot signal generating means and said index signal on said video tape and for reproducing a previously recorded index signal and at least a second signal from said video tape; and index signal separation means for separating said previously recorded index signal from said at least a second signal, wherein said at least a second signal reproduced by said recording/reproducing means comprises reproduced pilot signals which were previously recorded on said video tape, wherein said index signal has a frequency value which is different from frequency values of frequency difference signals, wherein said frequency values of said frequency difference signals respectively correspond to differences between frequencies of said reproduced pilot signals and a frequency of one of said reference pilot signals, and wherein said frequency difference signals are used for said tracking control.

2. The image recording/reproducing apparatus according to claim 1, wherein said search reference signal generating means comprises:

an oscillator for generating a reference frequency signal;

a frequency division controller for generating a first frequency division value when said mode selection signal indicates that said apparatus is operating in said index signal record mode and for generating a second frequency division value when said mode selection signal indicates that said apparatus is operating in said index signal separation mode; and a frequency signal generator for generating said index signal by frequency-dividing a frequency of said reference frequency signal according to said first frequency division value and for generating said index separation reference signal by frequency-dividing said frequency of said reference frequency signal according to said second frequency division value.

3. The image recording/reproducing apparatus according to claim 1, wherein said recording/reproducing means comprises a mixer for mixing said reference pilot signals output from said pilot signal generating means and said index signal output from said search reference signal generating means.

4. The image recording/reproducing apparatus according to claim 1, wherein said index signal has a frequency different from each of said reference pilot signals.

5. The image recording/reproducing apparatus according to claim 1, wherein said index signal is synchronized with one of said reference pilot signals.

6. The image recording/reproducing apparatus according to claim 5, wherein said index separation reference signal has a frequency which is substantially equivalent to said one of said reference pilot signals.

7. The image recording/reproducing apparatus according to claim 1, wherein said index signal is generated in accordance with at least said pilot selection signal and said mode selection signal when said mode selection signal indicates that said apparatus is operating in said index signal record mode, and wherein said index separation reference signal is generated in accordance with at least said pilot selection signal and said mode selection signal when said mode selection signal indicates that said apparatus is operating in said index signal separation mode.

8. The image recording/reproducing apparatus according to claim 1, wherein said index signal has a frequency different from each of said reference pilot signals, wherein said index signal is synchronized with one of said reference pilot signals, wherein said index separation reference signal has a frequency which is substantially equivalent to said one of said reference pilot signals, wherein said index signal is generated in accordance with at least said pilot selection signal and said mode selection signal when said mode selection signal indicates that said apparatus is operating in said index signal record mode, and wherein said index separation reference signal is generated in accordance with at least said pilot selection signal and said mode selection signal when said mode selection signal indicates that said apparatus is operating in said index signal separation mode.

9. The image recording/reproducing apparatus according to claim 1, wherein said index signal separation means separates said previously recorded index signal from said at least said second signal in accordance with said index separation reference signal.

10. The image recording/reproducing apparatus according to claim 1, wherein said pilot signal generating means generates said reference pilot signals based on said pilot selection signal.

11. An image recording/reproducing apparatus, which is capable of searching for information recorded on a video tape based on signals recorded on a track of said video tape and which is capable of performing tracking control in accordance with reference pilot signals, the apparatus comprising:

control means for generating a mode selection signal and a pilot selection signal, wherein said mode selection signal indicates whether said apparatus is operating in an index signal record mode or an index signal separation mode;

pilot signal generating means for sequentially and cyclically generating said reference pilot signals;

search reference signal generating means for generating an index signal and an index separation reference signal based on at least one of said mode selection signal and said pilot selection signal;

recording/reproducing means for recording said reference pilot signals output from said pilot signal generating means and said index signal on said video tape and for reproducing a previously recorded index signal and at least a second signal from said video tape;

index signal separation means for separating said previously recorded index signal from said at least a second signal a demodulator for demodulating said previously recorded index signal and said at least a second signal output from said recording/reproducing means in accordance with said index separation reference signal output from said search reference signal generating means to produce a demodulated signal; and a band pass filter for filtering said demodulated signal to produce a reproduced index signal having only a preset frequency component.

12. The image recording/reproducing apparatus according to claim 11, further comprising search control signal generating means for generating a search control signal based on said reproduced index signal from said index signal separation means.

13. The image recording/reproducing apparatus according to claim 12, wherein said search control signal generating means comprises:

a pulse generator for generating a pulse signal according to said reproduced index signal output from said index signal separation means; and a logic multiplier for outputting said search control signal by logically multiplying said pulse signal and a high-speed search mode signal, wherein said high-speed search mode signal is supplied to said logic multiplier when said mode selection signal indicates that said apparatus is in said index signal separation mode.

14. The image recording/reproducing apparatus according to claim 13, wherein said pulse generator has a monostable circuit which is capable of varying a duty cycle of said pulse signal in order to vary a playing time of a video signal contained on a track of said video tape on which said previously recorded index signal is contained.

15. The image recording/reproducing apparatus according to claim 13, wherein said search control signal generating means comprises a logic adder which inputs said search control signal and a play mode signal and which logically adds said search control signal and said play mode signal to produce a control signal, wherein said play mode signal is supplied to said logic adder when said apparatus is operating in a reproduction mode, and wherein said control signal controls an operation of said apparatus.

16. An image recording/reproducing apparatus, which is capable of searching for information recorded on a video tape based on signals recorded on a track of said video tape and which is capable of performing tracking control in accordance with reference pilot signals, the apparatus comprising:

control means for generating a mode selection signal and a pilot selection signal, wherein said mode selection signal indicates whether said apparatus is operating in an index signal record mode or an index signal separation mode;

pilot signal generating means for sequentially and cyclically generating said reference pilot signals;

search reference signal generating means for generating an index signal and an index separation reference signal based on at least one of said mode selection signal and said pilot selection signal;

recording/reproducing means for recording said reference pilot signals output from said pilot signal generating means and said index signal on said video tape and for reproducing a previously recorded index signal and at least a second signal from said video tape, wherein said at least a second signal comprises reproduced pilot signals which were previously recorded on said video tape; and index signal separation means for separating said previously recorded index signal from said at least a second signal, wherein said index signal has a frequency value which is different from frequency values of frequency difference signals and wherein said frequency values of said frequency difference signals respectively correspond to differences between frequencies of said reproduced pilot signals and a frequency of one of said reference pilot signals, and wherein said frequency difference signals are used for said tracking control.

17. The image recording/reproducing apparatus according to claim 16, wherein said index signal has a frequency different from each of said reference pilot signals.

18. The image recording/reproducing apparatus according to claim 16, wherein said index signal is synchronized with one of said reference pilot signals.

19. The image recording/reproducing apparatus according to claim 18, wherein said index separation reference signal has a frequency which is substantially equivalent to said one of said reference pilot signals.

20. The image recording/reproducing apparatus according to claim 16, wherein said index signal is generated in accordance with at least said pilot selection signal and said mode selection signal when said mode selection signal indicates that said apparatus is operating in said index signal record mode, and wherein said index separation reference signal is generated in accordance with at least said pilot selection signal and said mode selection signal when said mode selection signal indicates that said apparatus is operating in said index signal separation mode.

21. The image recording/reproducing apparatus according to claim 16, wherein said index signal has a frequency different from each of said reference pilot signals, wherein said index signal is synchronized with one of said reference pilot signals, wherein said index separation reference signal has a frequency which is substantially equivalent to said one of said reference pilot signals, wherein said index signal is generated in accordance with at least said pilot selection signal and said mode selection signal when said mode selection signal indicates that said apparatus is operating in said index signal record mode, and wherein said index separation reference signal is generated in accordance with at least said pilot selection signal and said mode selection signal when said mode selection signal indicates that said apparatus is operating in said index signal separation mode.

22. The image recording/reproducing apparatus according to claim 16, wherein said index signal separation means separates said previously recorded index signal from said at least said second signal in accordance with said index separation reference signal.

23. The image recording/reproducing apparatus according to claim 16, wherein said pilot signal generating means generates said reference pilot signals based on said pilot selection signal.

* * * * *